United States Patent
Nakamura

(10) Patent No.: US 10,031,212 B2
(45) Date of Patent: Jul. 24, 2018

(54) OBJECT DETECTION DEVICE AND REMOTE SENSING APPARATUS

(71) Applicant: Tadashi Nakamura, Tokyo (JP)

(72) Inventor: Tadashi Nakamura, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 517 days.

(21) Appl. No.: 14/658,650

(22) Filed: Mar. 16, 2015

(65) Prior Publication Data

US 2015/0268332 A1 Sep. 24, 2015

(30) Foreign Application Priority Data

Mar. 19, 2014 (JP) .................... 2014-055720

(51) Int. Cl.
*G01S 7/481* (2006.01)
*G01S 17/42* (2006.01)
(Continued)

(52) U.S. Cl.
CPC ........... *G01S 7/4811* (2013.01); *G01S 7/4815* (2013.01); *G01S 7/4817* (2013.01); *G01S 17/023* (2013.01);
(Continued)

(58) Field of Classification Search
CPC ........ G01S 7/4811; G01S 17/08; G01S 17/42; G01S 7/4815; G01S 7/4817; G01S 17/936; G02B 26/125; G02B 26/123
See application file for complete search history.

(56) References Cited

U.S. PATENT DOCUMENTS 5,471,215 A 11/1995 Fukuhara et al.
5,493,388 A 2/1996 Adachi
(Continued)

FOREIGN PATENT DOCUMENTS

EP 1 850 165 A1 10/2007
EP 2 687 865 A1 1/2014
(Continued)

OTHER PUBLICATIONS

Extended European Search Report dated Sep. 7, 2015 in the corresponding European Application No. 15158844.9.
(Continued)

*Primary Examiner* — Luke D Ratcliffe
(74) *Attorney, Agent, or Firm* — Oblon, McClelland, Maier & Neustadt, L.L.P.

(57) ABSTRACT

An object detection device includes a light source unit that emits light toward an object positioned in a detection area, an optical deflector including a reflection surface to reflect light, which is emitted from the light source unit and reflected from the object, incident on the reflection surface, an optical system arranged on an optical path of the light reflected from the reflection surface, and a light-receiving unit configured to receive the light passed through the optical system. The optical system vignettes a part of one, which is incident on the reflection surface at a smaller incident angle than the other, of light reflected from the object in a first end portion of the detection area and light reflected from the object in a second end portion that is on the side opposite from the first end portion of the detection area.

12 Claims, 18 Drawing Sheets

(51) Int. Cl.
  *G01S 17/93* (2006.01)
  *G02B 26/12* (2006.01)
  *G01S 17/02* (2006.01)
  *G01S 17/08* (2006.01)

(52) U.S. Cl.
  CPC .............. *G01S 17/08* (2013.01); *G01S 17/42* (2013.01); *G01S 17/936* (2013.01); *G02B 26/123* (2013.01); *G02B 26/125* (2013.01)

(56) References Cited

U.S. PATENT DOCUMENTS

| | | | |
|---|---|---|---|
| 9,568,605 | B2 | 2/2017 | Akatsu et al. |
| 9,804,385 | B2 | 10/2017 | Itami et al. |
| 9,817,123 | B2 | 11/2017 | Akatsu et al. |
| 2005/0151958 | A1 | 7/2005 | Beuschel et al. |
| 2014/0009747 | A1 | 1/2014 | Suzuki et al. |
| 2014/0034817 | A1 | 2/2014 | Nakamura et al. |
| 2014/0036071 | A1 | 2/2014 | Nakamura et al. |
| 2014/0209793 | A1 | 7/2014 | Nakamura et al. |
| 2015/0204977 | A1* | 7/2015 | Sakai ............... G01S 17/42 356/4.01 |
| 2015/0268332 | A1 | 9/2015 | Nakamura |

FOREIGN PATENT DOCUMENTS

| | | |
|---|---|---|
| JP | 5-113481 | 5/1993 |
| JP | 06-102343 | 4/1994 |
| JP | 07-072239 | 3/1995 |
| JP | 2014-020889 | 2/2014 |
| JP | 2014-029317 | 2/2014 |
| JP | 2014-032149 | 2/2014 |
| JP | 2014-052366 | 3/2014 |
| JP | 2014-145744 | 8/2014 |
| JP | 2014-232265 A | 12/2014 |
| JP | 2014-235075 A | 12/2014 |
| JP | 2015-111090 A | 6/2015 |
| JP | 2015-129734 | 7/2015 |
| JP | 2015-178975 | 10/2015 |
| JP | 2015-215282 | 12/2015 |

OTHER PUBLICATIONS

Japanese Office Action dated Jan. 26, 2018 in Japanese Application No. 2014-055720. 3 pages.

* cited by examiner

OBJECT DETECTION DEVICE AND REMOTE SENSING APPARATUS

CROSS-REFERENCE TO RELATED APPLICATIONS

The present application claims priority to and incorporates by reference the entire contents of Japanese Patent Application No. 2014-055720 filed in Japan on Mar. 19, 2014.

BACKGROUND OF THE INVENTION

1. Field of the Invention

The present invention relates generally to an object detection device and a remote sensing apparatus and, more particularly, to an object detection device for detecting an object and a remote sensing apparatus including the object detection device.

2. Description of the Related Art

Object detection devices for detecting presence/absence of an object and the distance to the object have been actively developed in recent years.

For example, Japanese Laid-open Patent Application No. H7-072239 discloses a laser ranging apparatus including a laser light source, a rotating polygon mirror, a nodding mechanism, a light condenser, and a detector. The rotating polygon mirror reflects transmitter laser light emitted from the laser light source toward a target while rotating about a rotation shaft to move the transmitting laser light in a rotating direction of the polygon mirror. The nodding mechanism swings the rotation shaft of the rotating polygon mirror in a direction to tilt, thereby shifting the transmitter laser light, which is moving in the rotating direction, in a direction perpendicular to the rotating direction. The light condenser receives receiver laser light reflected from the target via the rotating polygon mirror. The detector converts the receiver laser light passed through the light condenser into electrical signals.

However, such a conventional object detection device as that described above is disadvantageous in posing difficulty in achieving compact construction and enhancing flexibility.

Under the circumstances, there is a need for an object detection device capable of not only achieving compact construction but also enhancing flexibility.

It is an object of the present invention to at least partially solve the problem in the conventional technology.

SUMMARY OF THE INVENTION

It is an object of the present invention to at least partially solve the problems in the conventional technology.

According to the present invention, there is provided an object detection device comprising: a light source unit configured to emit light toward a detection area; an optical deflector including a reflection surface which receives and reflects, when an object is positioned in the detection area, light being emitted from the light source unit and reflected from the object; an optical system arranged on an optical path of the light reflected from the reflection surface of the optical deflector; and a light-receiving unit configured to receive the light passed through the optical system, the optical system vignetting a part of one, the one being incident on the reflection surface at an incident angle smaller than the other, of light reflected from the object in a first end portion of the detection area and light reflected from the object in a second end portion of the detection area, the first end portion and the second end portion being on opposite sides of the detection area.

The present invention also provides a remote sensing apparatus comprising: the above-described object detection device; and a monitoring control device configured to obtain motion information including at least any one of whether or not the object is moving, a moving direction of the object, and a moving velocity of the object based on an output of the object detection device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

To detect an object in a large detection area, it is effective to scan the detection area using an optical deflector. When an optical deflector, an imaging forming lens, and a photodetector are arranged along a scanning direction, the amount of light received by the imaging forming lens is larger at an end portion of a detection area on the side near the imaging forming lens than at an end portion on the side far from the imaging forming lens.

The difference in the amount of the received light between the opposite ends in scanning direction has conventionally not been discussed. For example, assume a case in which an object detection device is mounted on a vehicle. There is a case where position of driver's seat varies from one country to another and, in that case, desired object detection area varies horizontally. If the object detection device performs horizontal scanning, the amount of received light varies between opposite ends in the scanning direction. As a result, the need of changing specification and/or configuration of the object detection device to adapt to country-specific situation can arise.

Exemplary embodiments of the present invention are described below with reference to the accompanying drawings.

Figure 1:
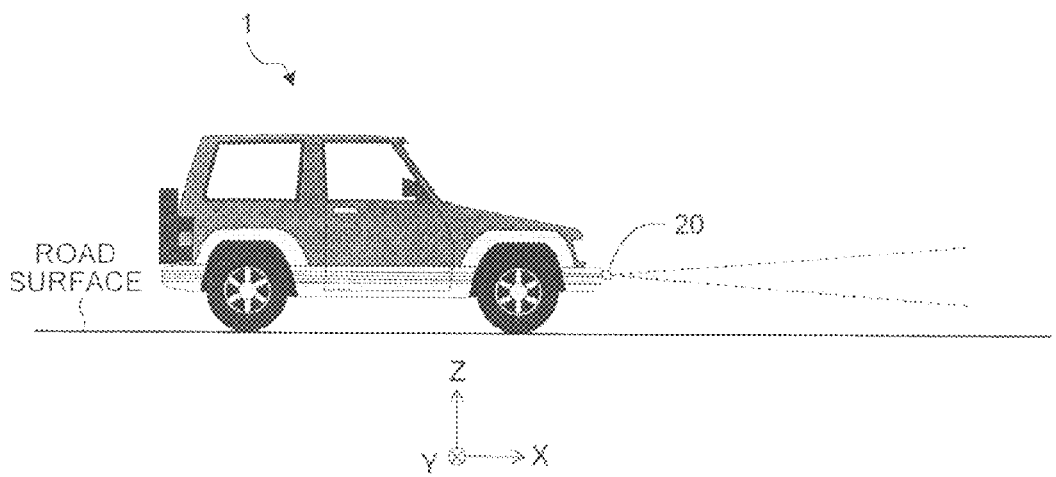
FIG. 1 is an exterior view of a vehicle including onboard a laser radar device according to an embodiment of the present invention.

An embodiment of the present invention is described below with reference to FIGS. 1 to 15. FIG. 1 is an exterior view of a vehicle 1 including onboard a laser radar device 20 which is an embodiment example of object detection device according to an aspect of the present invention.

The laser radar device 20 is mounted on the vehicle 1 at a position forward of driver's seat, for example. Hereinafter, it is assumed that, in an XYZ three-dimensional Cartesian coordinate system, a direction perpendicular to road surface is the Z-axis direction, the direction in which the vehicle 1 moves forward is the positive X-direction.

Figure 2:
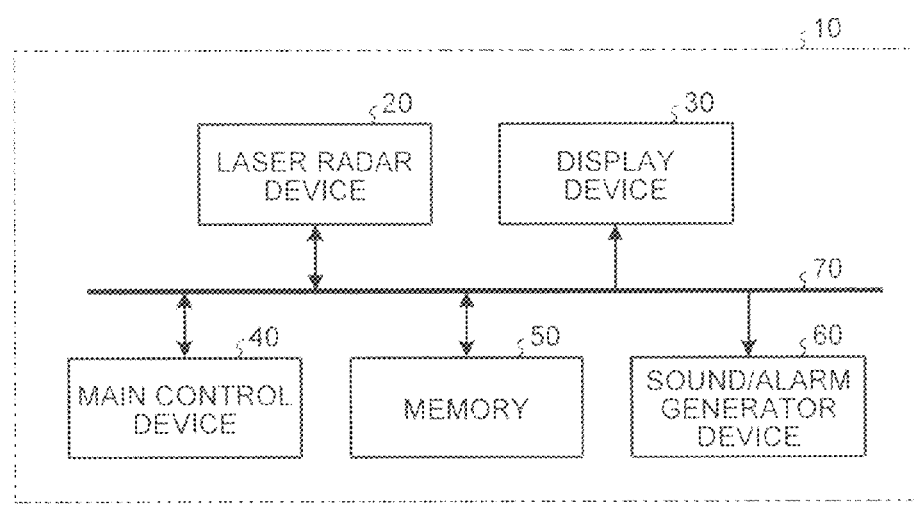
FIG. 2 is a block diagram for describing a configuration of a monitoring apparatus according to an embodiment of the present invention.

As illustrated in FIG. 2, for example, the vehicle 1 internally includes a display device 30, a main control device 40, a memory 50, and a sound/alarm generator device 60. These devices are electrically connected to each other via a bus 70 over which data can be transmitted.

In the illustrated example, the laser radar device 20, the display device 30, the main control device 40, the memory 50, and the sound/alarm generator device 60 make up a monitoring apparatus 10 which is an embodiment example of remote sensing apparatus. Hence, the monitoring apparatus 10 is mounted on the vehicle 1.

Figure 3A:
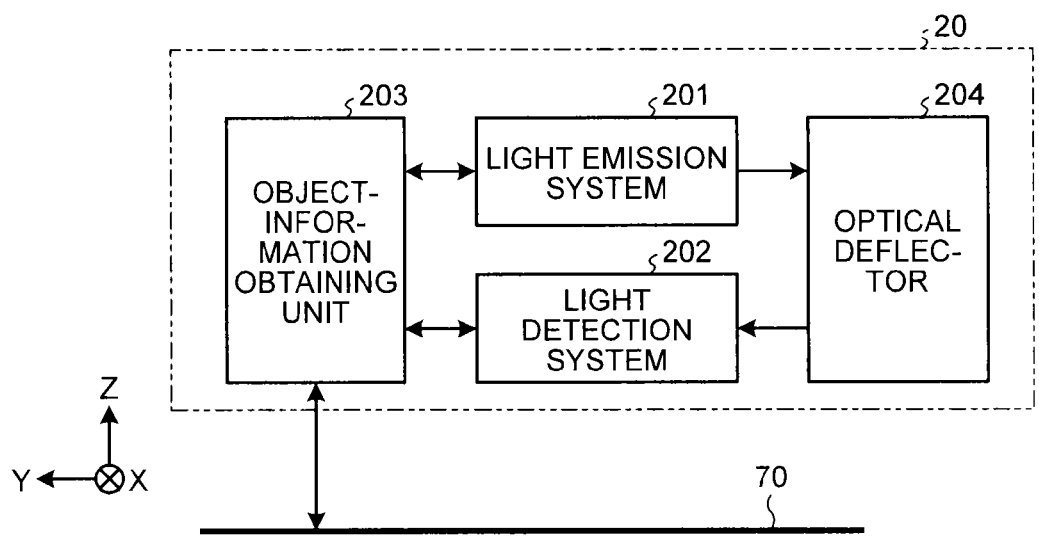
FIGS. 3A and 3B are diagrams each for describing a configuration of the laser radar device.
Figure 3B:
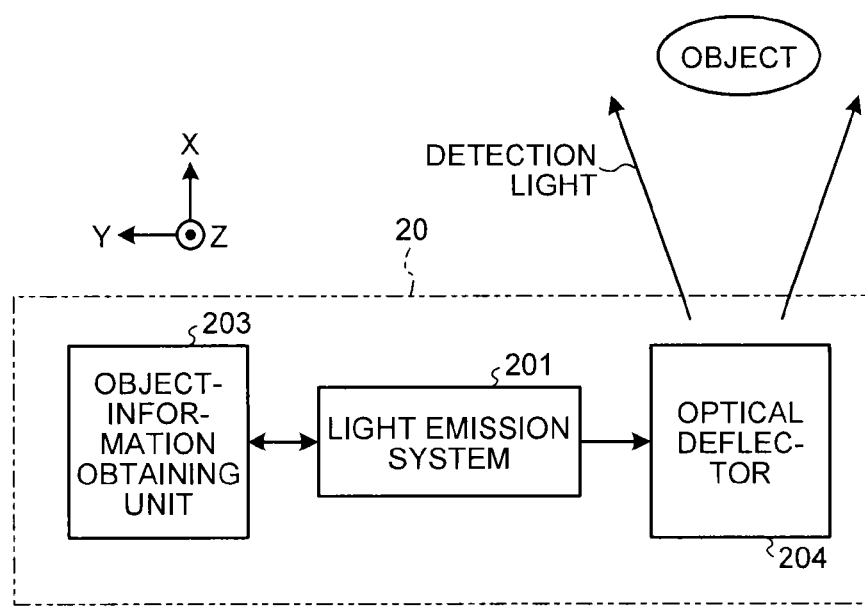

As illustrated in FIGS. 3A and 3B, for example, the laser radar device 20 includes a light emission system 201, an optical deflector 204, a light detection system 202, and an object-information obtaining unit 203. The light emission system 201 emits light. The optical deflector 204 deflects the light emitted from the light emission system 201 toward a detection area. The light detection system 202 detects the light reflected from an object by way of the optical deflector 204. The object-information obtaining unit 203 controls the light emission system 201 and the optical deflector 204 and obtains object information such as presence/absence of an object, the distance to the object, the size of the object, the shape of the object, and/or the position of the object based on a detection result output from the light detection system 202. In the illustrated example, the light emission system 201 is arranged on the positive Z side of the light detection system 202. The light emission system 201, the optical deflector 204, the light detection system 202, and the object-information obtaining unit 203 are housed in a casing (not shown).

Figure 4:
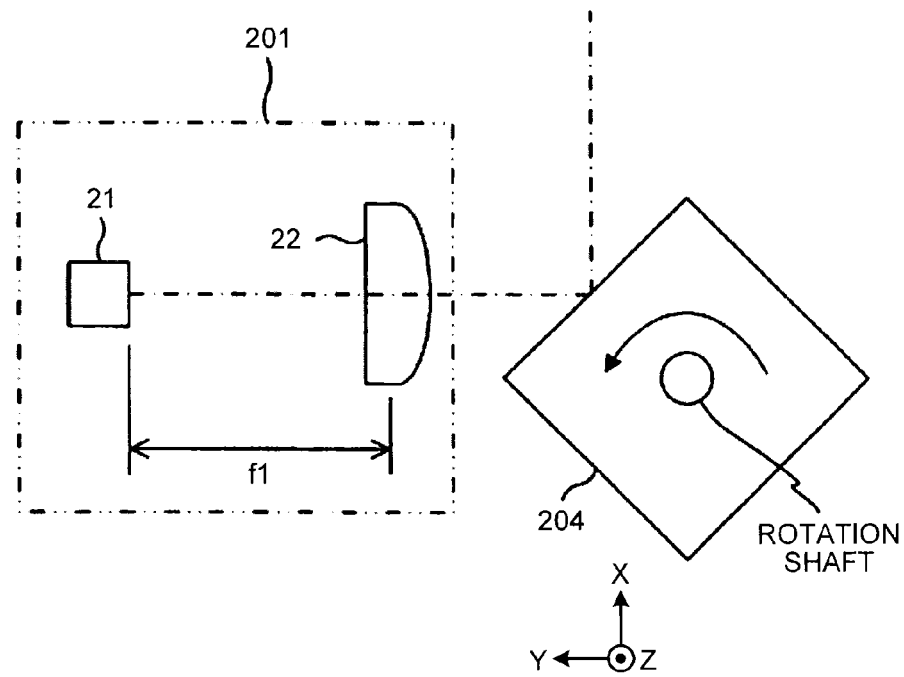
FIG. 4 is a diagram for describing a light emission system.

The light emission system 201 includes a light source 21 and a coupling lens 22 as illustrated in FIG. 4, for example.

Figure 5:
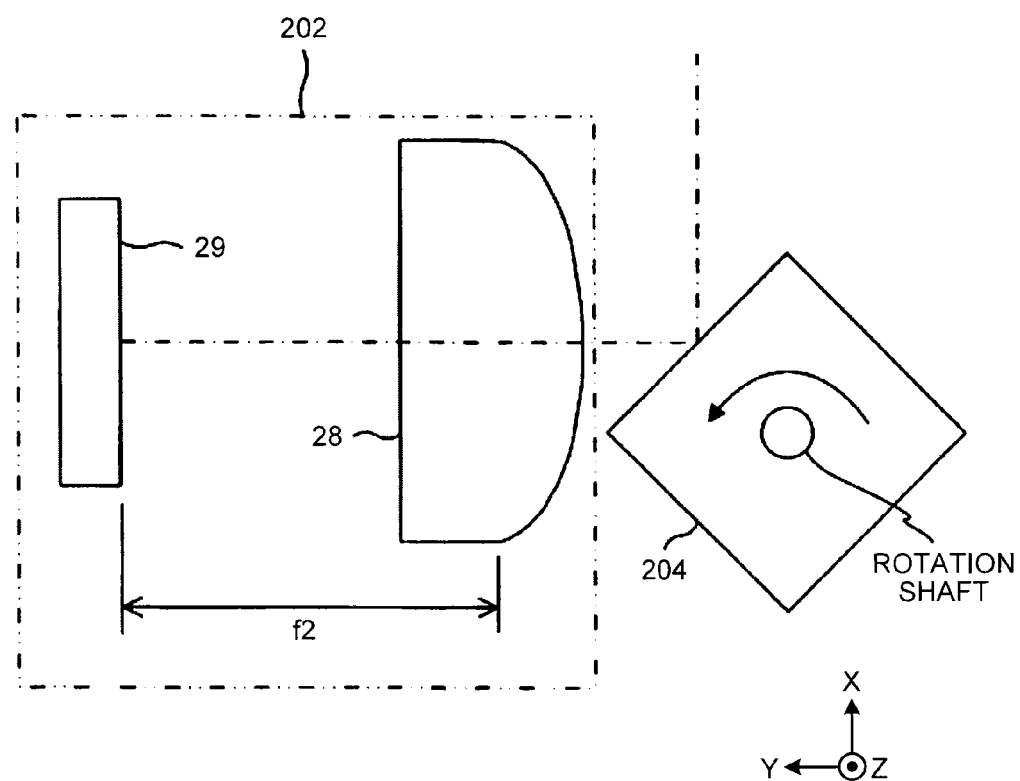
FIG. 5 is a diagram for describing a light detection system.

The light detection system 202 includes an imaging forming lens 28 and a photodetector 29 as illustrated in FIG. 5, for example.

Figure 6:
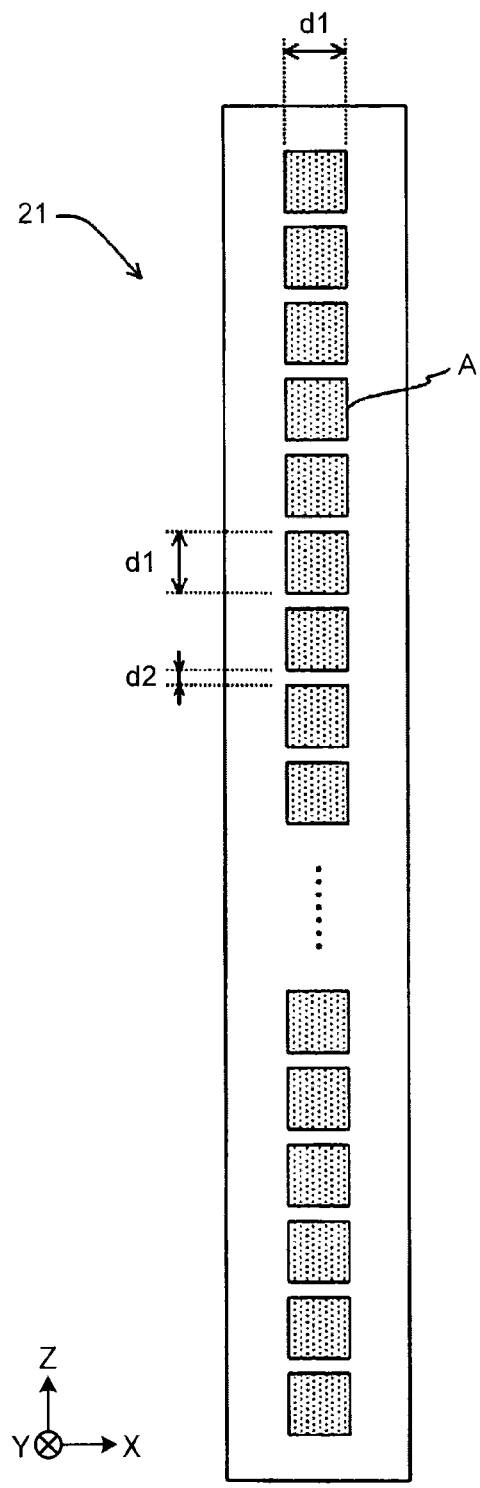
FIG. 6 is a diagram for describing a plurality of light-emitting device arrays.

The light source 21 includes a plurality of light-emitting device arrays A equidistantly arranged in the Z-axis direction as illustrated in FIG. 6, for example. In the illustrated example, each of the light-emitting device arrays A assumes a square shape that is d1 in length on each side. The gap between each adjacent two of the light-emitting device arrays A is denoted as d2.

Figure 7:
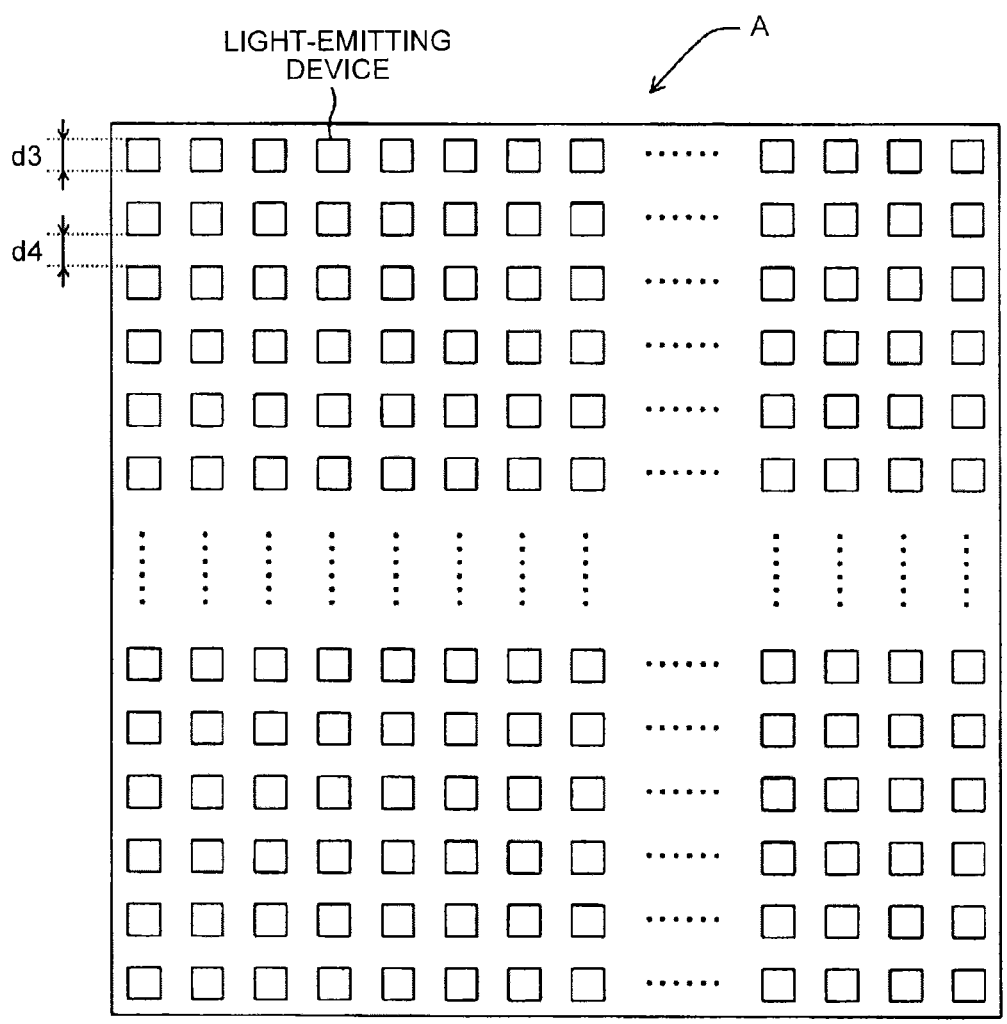
FIG. 7 is a diagram for describing a plurality of light-emitting devices included in each of the light-emitting device arrays.

In each of the light-emitting device arrays A, a plurality of light-emitting devices are arranged in a two-dimensional array as illustrated in FIG. 7, for example. Each of the light-emitting devices assumes a square shape that is d3 in length on each side. The gap between each adjacent two of the light-emitting devices is denoted as d4. The length d1 denoted above depends on the number of the light-emitting devices included in the light-emitting device array.

Each of the light-emitting devices is a vertical-cavity surface-emitting laser (VCSEL). Accordingly, the light source 21 is what is generally referred to as a surface-emitting laser array.

Each of the light-emitting devices is turned on and off by the object-information obtaining unit 203. When turned on, the light-emitting device emits light in the negative Y-direction.

In the illustrated example, the number of the light-emitting device arrays A included in the light source 21 is 28. In each of the light-emitting device arrays A, the number of rows of the light-emitting devices along the X-axis direction is 240, and the number of the columns of the same along the Z-axis direction is 240. Hence, the number of the light-emitting devices included in each of the light-emitting device arrays A is 57,600(=240×240). In the illustrated example, d2 is approximately 0.02 mm (millimeters); d3 is approximately 0.7 μm (micrometers); d4 is approximately 1 μm. Accordingly, when the single light-emitting device has light-emitting power of 1 mW (milliwatts), light-emitting power of the single light-emitting device array A is 57.6 W (watts).

Figure 8:
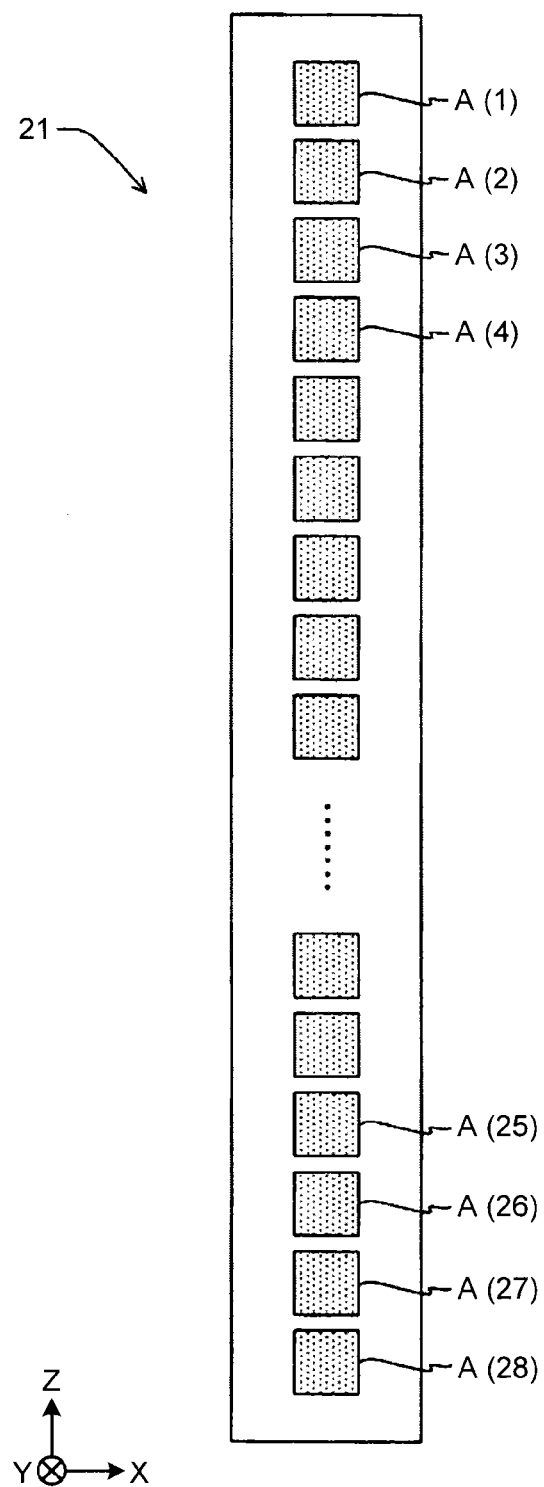
FIG. 8 is a diagram for describing a light-emitting device array.

When distinguishing the 28 light-emitting device arrays A individually, the light-emitting device array is represented as A(i) (1≤i≤28), where i represents the ordinal number of the light-emitting device array in the negative Z-direction as illustrated in FIG. 8.

Referring back to FIG. 4, the coupling lens 22 is arranged on the negative Y side of the light source 21. A coupling optical system including a plurality of optical elements to provide a function similar to that of the coupling lens 22 may be employed in lieu of the coupling lens 22.

The distance in the Y-axis direction between a light-emitting surface of the light source 21 and the principal plane of the coupling lens 22 is equal to the focal length (which is denoted as "f1") of the coupling lens 22. Meanwhile, because the light-emitting device array A has a certain area, light passed through the coupling lens 22 is slightly-diverging light.

The optical deflector 204 includes a rotating polygon mirror which rotates about a rotation shaft extending parallel to the Z-axis and deflects light traveling from the coupling lens 22. Each mirror facet of the rotating polygon mirror is parallel to the rotation shaft. In the illustrated example, the rotating polygon mirror has four mirror facets. Rotation of the rotating polygon mirror is controlled by the object-information obtaining unit 203. Detection light emitted from the laser radar device 20 denotes light reflected from the mirror facet of the rotating polygon mirror (see FIG. 3B). Hereinafter, the mirror facet of the rotating polygon mirror may be referred to as the "reflection surface".

Figure 9:
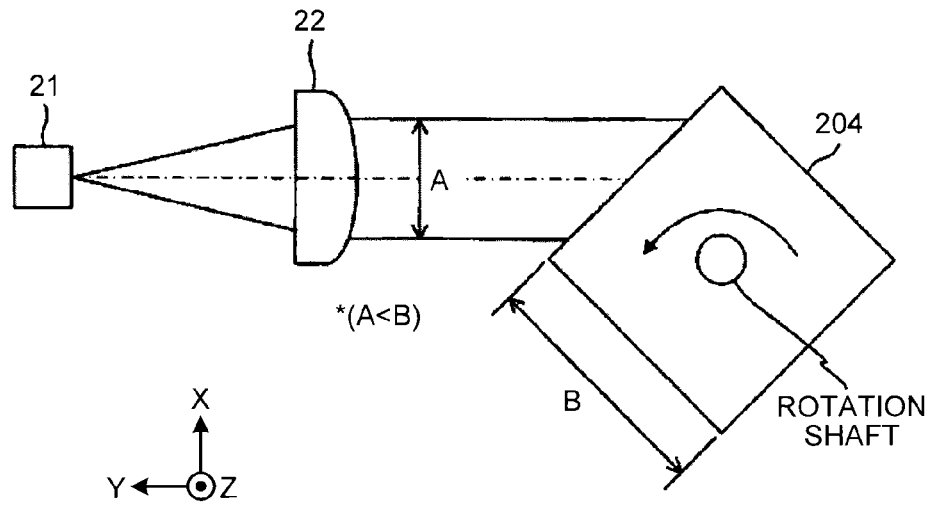
FIG. 9 is a diagram for describing relationship between beam diameter of light exiting from a coupling lens and size of a reflection surface.

As illustrated in FIG. 9, a beam diameter A of light passed through the coupling lens 22 and impinging on the optical deflector 204 is smaller than a size B of the reflection surface. The size B is corresponding to a length of a side of the reflection surface of which the side is perpendicular to the rotation shaft. This relationship allows the detection light to have high optical power, thereby increasing a detectable distance.

Figure 10:
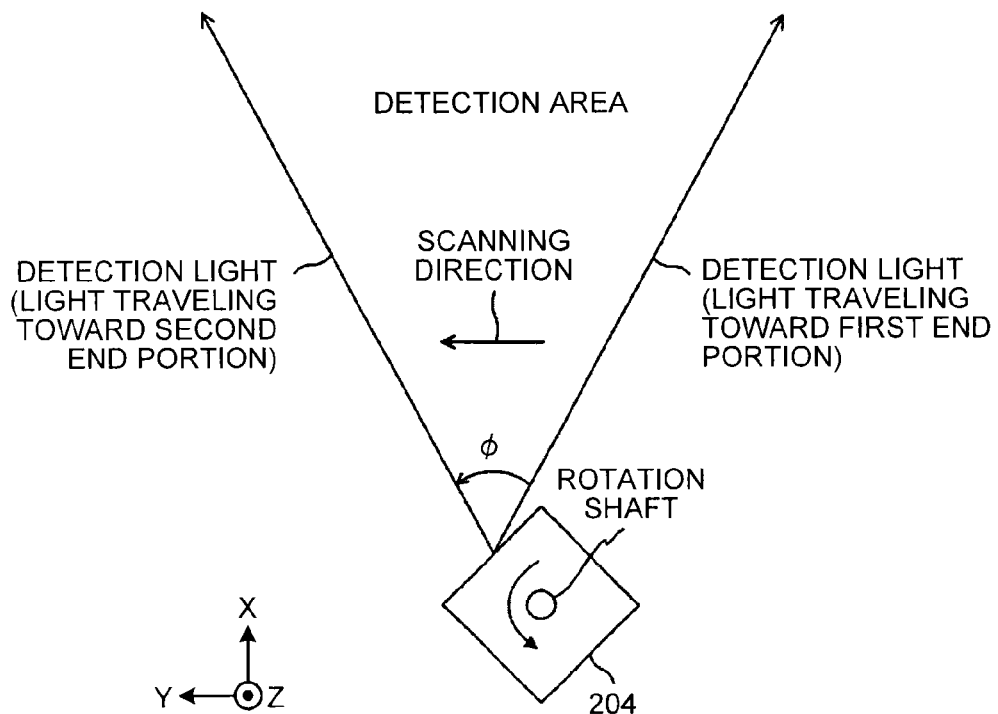
FIG. 10 is a diagram for describing detection light exiting from an optical deflector.

As the rotating polygon mirror rotates, traveling direction of the detection light in a plane orthogonal to the Z-axis shifts as illustrated in FIG. 10, for example. Put another way, the detection light is scanned along the Y-axis direction as the rotating polygon mirror rotates. In the illustrated example, the detection light is scanned in the positive Y-direction. Hereinafter, an angle φ (see FIG. 10) between a traveling direction of light traveling toward an end portion of the detection area on the negative Y side (hereinafter, the "negative-Y-side end portion") and a traveling direction of light traveling toward an end portion of the detection area on the positive Y side (hereinafter, the "positive-Y-side end portion") may be referred to as a scan angle. Accordingly, a scanning area defined by the scan angle φ is the detection area.

Hereinafter, the negative-Y-side end portion of the detection area is referred to as the "first end portion"; the positive-Y-side end portion of the detection area is referred to as the "second end portion".

The optical deflector 204 includes a sensor (e.g., a Hall element) for detecting a rotation angle of the rotating polygon mirror. The optical deflector 204 is configured to transmit an output signal of the sensor to the object-information obtaining unit 203. Put another way, the object-information obtaining unit 203 can obtain the rotation angle of the rotating polygon mirror based on the output signal of the sensor.

When an object is present in the detection area, a part of light emitted from the laser radar device 20 and reflected from the object returns to the laser radar device 20. Hereinafter, light that returns to the laser radar device 20 by being reflected from an object may be referred to as "object-reflected light" for convenience. Meanwhile, because the size of the object is by far larger than the beam diameter of detection light, it is unnecessary to take vignetting of the detection light by the object into consideration.

The rotating polygon mirror reflects object-reflected light in the positive Y-direction.

Referring back to FIG. 5, the imaging forming lens 28 is arranged on the positive Y side of the optical deflector 204 to condense light reflected from the rotating polygon mirror. The end portion of the detection area on the side far from the imaging forming lens 28 is the first end portion. The end portion on the side near the imaging forming lens 28 is the second end portion. The optical axis of the imaging forming lens 28 is parallel to the Y-axis.

Figure 11:
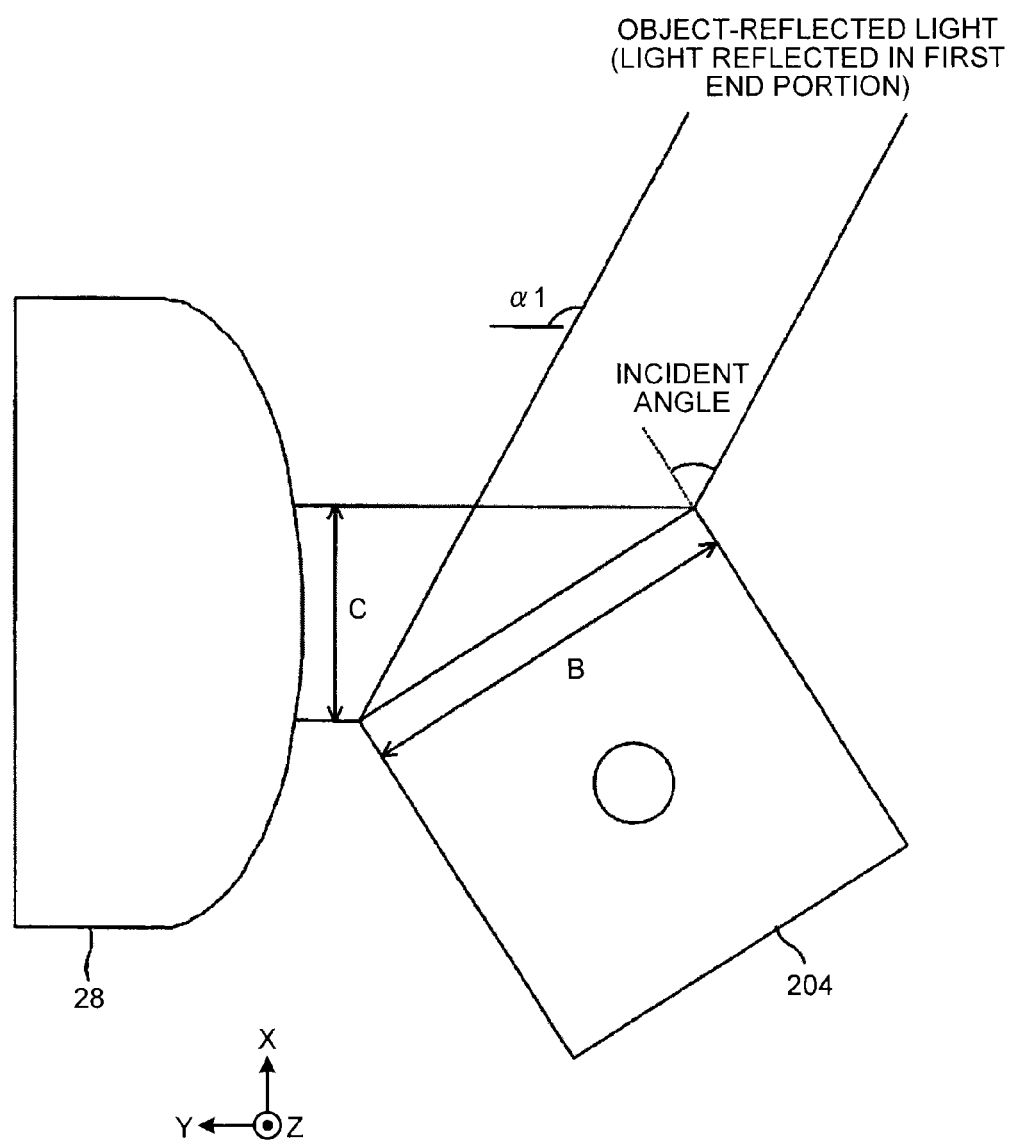
FIG. 11 is a diagram for describing object-reflected light that is reflected in a first end portion and reflected from a rotating polygon mirror.

FIG. 11 illustrates object-reflected light that is reflected in the first end portion and reflected from the rotating polygon mirror. A beam diameter of the light impinging on the imaging forming lens 28 after being reflected from the rotating polygon mirror is denoted as C. The diameter C can be expressed by the following Equation (1):

$$C = B \cos(\alpha 1/2) \tag{1}$$

where α1 is an angle, on the X-Y plane, between an incident direction of the object-reflected light and the Y-axis, B is the size of the reflection surface. The size B is corresponding to a length of a side of the reflection surface of which the side is perpendicular to the rotation shaft of the optical deflector 204.

Figure 12:
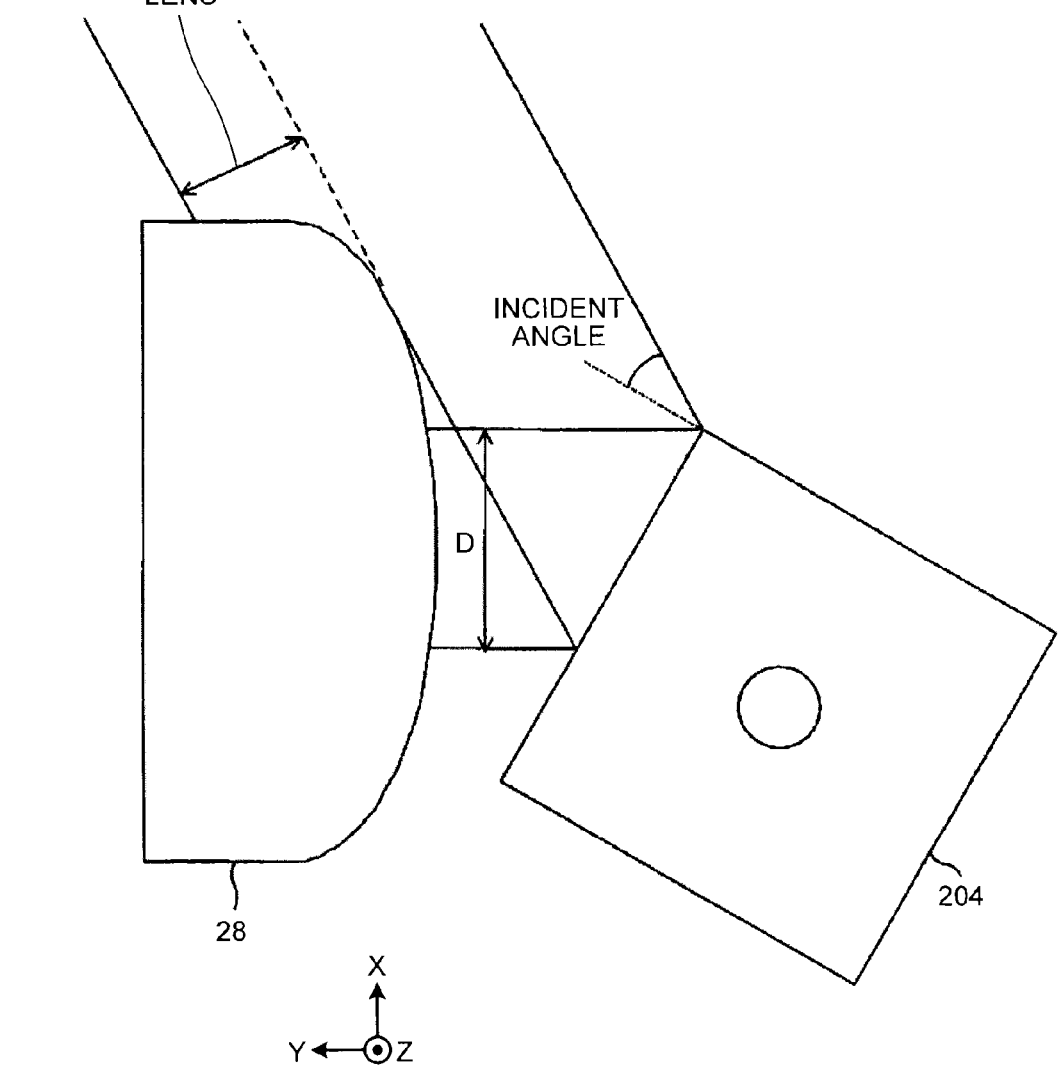
FIG. 12 is a diagram for describing object-reflected light that is reflected in a second end portion and reflected from the rotating polygon mirror.
Figure 13:
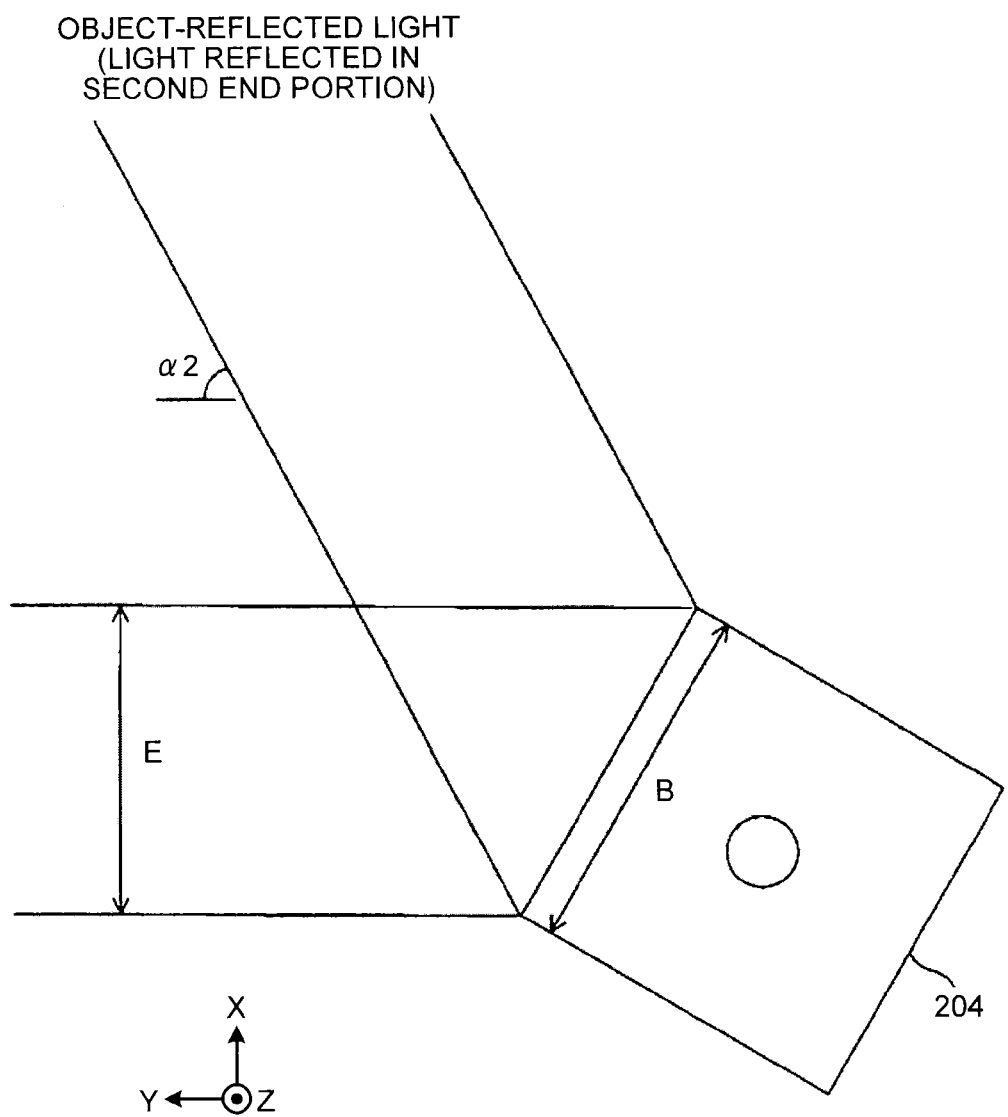
FIG. 13 is a diagram for describing object-reflected light that is reflected in the second end portion and reflected from the rotating polygon mirror without being vignetted by an imaging forming lens.

FIG. 12 illustrates object-reflected light that is reflected in the second end portion and reflected from the rotating polygon mirror. The optical deflector 204 of the illustrated example is configured so that the imaging forming lens 28 vignettes a part of this object-reflected light. More specifically, the optical deflector 204 is configured so that the imaging forming lens 28 vignettes a part of one (one incident on the reflection surface at a smaller incident angle) of light reflected from the object in the first end portion of the detection area and light reflected from the object in the second end portion of the detection area. The optical deflector 204 is configured so that D, which is a beam diameter of light reflected from the rotating polygon mirror and impinging on the imaging forming lens 28, is substantially equal to the diameter C. A beam diameter of object-reflected light, none of which is vignetted by the imaging forming lens 28, incident on the imaging forming lens 28 is denoted as E (see FIG. 13). The diameter E can be expressed by the following Equation (2):

$$E = B \cos(\alpha 2/2) \tag{2}$$

where α2 is an angle, on the X-Y plane, between an incident direction of the object-reflected light and the Y-axis.

The optical deflector 204 of the illustrated example is configured so that light reflected from the center of the reflection surface passes through the optical axis of the imaging forming lens 28. This configuration allows reducing an effective area of the imaging forming lens 28 and thereby reducing the imaging forming lens 28 in size.

The photodetector 29 receives light passed through the imaging forming lens 28 and outputs a signal, the output level of which represents an amount of the received light, to the object-information obtaining unit 203. In the Y-axis direction, the distance between the principal plane of the imaging forming lens 28 and a light-receiving surface of the photodetector 29 is equal to the focal length (which is denoted as "f2") of the imaging forming lens 28.

When the output level of the photodetector 29 is equal to or higher than a preset threshold, the object-information obtaining unit 203 determines that object-reflected light is received. An avalanche photodiode (APD), a typical positive-intrinsic-negative (PIN) photodiode (PD), or like light-receiving device may be used as a light-receiving element of the photodetector 29.

The amount of object-reflected light reflected in the first end portion and received by the photodetector 29 and the amount of object-reflected light reflected in the second end portion and received by the photodetector 29 are substantially equal to each other.

Therefore, the need of changing specification and/or configuration of the object detection device to adapt to a desired object detection area is eliminated. This provides advantages including cost reduction by employing common parts and compact construction by reducing extra space which might otherwise be required to adapt to two or more configurations.

A central light beam of light emitted from the light source 21 is received at center of the photodetector 29 after passing through the optical axis of the imaging forming lens 28. This configuration is advantageous as described below. A window-like transparent member may be provided in the casing in such a manner that detection light is emitted through the transparent member. With the configuration, even if the transparent member has optical power, effect of the transparent member on the detection light is canceled out by effect of the transparent member on object-reflected light. As a result, reduction in the amount of light received by the photodetector 29 can be prevented or at least reduced.

In the illustrated example, the central light beam of the light emitted from the light source 21 and the light beam passing through the optical axis of the imaging forming lens 28 are parallel to each other. As viewed along the Z-axis, the central light beam of the light emitted from the light source 21 and the light beam passing through the optical axis of the imaging forming lens 28 overlap each other.

The object-information obtaining unit 203 turns on and off the light source 21 and controls driving of the rotating polygon mirror. The object-information obtaining unit 203 determines presence/absence of an object based on the output signal of the photodetector 29. Upon determining that an object is present, the object-information obtaining unit 203 obtains the distance to the object and the like based on information about when the light source 21 is turned on (hereinafter, "turn-on time") and information about when the photodetector 29 receives light (hereinafter, "light-receiving time").

Figure 14:
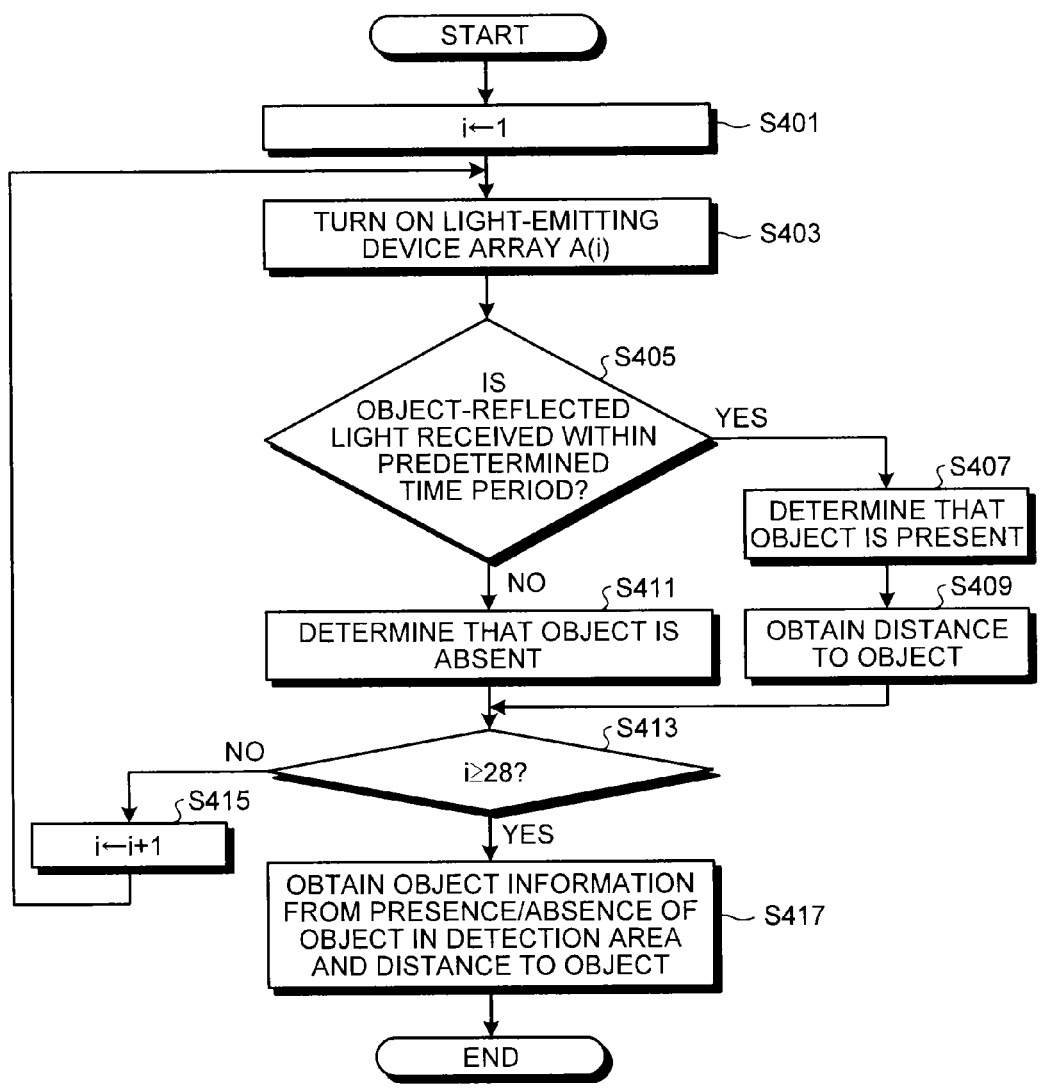
FIG. 14 is a flowchart for describing a process performed by an object-information obtaining unit.

FIG. 14 is a flowchart of an object-information obtaining process performed by the object-information obtaining unit 203. The object-information obtaining unit 203 repeatedly performs this object-information obtaining process every preset timing intervals (e.g., every 20 milliseconds (msec)) until power supply is turned off.

At step S401, a variable i, by which each of the light-emitting device arrays is specified, is set to its initial value, 1.

At step S403, the light-emitting device array A(i) is turned on. Although turn-on duration is 20 nanoseconds (nsec) in the illustrated example, the duration is not limited thereto.

At step S405, whether or not object-reflected light is received within a predetermined time period is determined. If object-reflected light is received within the predetermined time period (Yes at step S405), processing proceeds to step S407. Although the predetermined time period is 2 microseconds (μsec) in the illustrated example, the time period is not limited thereto.

At step S407, it is determined that an object is present in the detection area.

At step S409, the distance to the object is obtained based on turn-on time of the light source 21 and light-receiving time of the photodetector 29. The distance to the object obtained at step S409 is stored, together with information indicating that the object is present, time when the object is detected (hereinafter, "detection time"), and the value of the variable i, in a memory (not shown) of the object-information obtaining unit 203. Thereafter, processing proceeds to step S413.

If object-reflected light is not received within the predetermined time period at step S405 (No at step S405), processing proceeds to step S411.

At step S411, it is determined that an object is absent in the detection area. Thereafter, information indicating that the object is absent is stored, together with the detection time and the value of the variable i, in the memory (not shown) of the object-information obtaining unit 203. Thereafter, processing proceeds to step S413.

At step S413, whether or not the value of the variable i is equal to or larger than 28 is determined. If the value of the variable i is smaller than 28 (No at step S413), processing proceeds to step S415.

At step S415, the value of the variable i is incremented by 1, and processing returns to step S403.

The loop of step S403 through step S415 is repeatedly performed until a YES result is obtained at step S413.

If the value of the variable i is equal to or larger than 28 (Yes at step S413), processing proceeds to step S417.

At step S417, the information about presence/absence of an object in the detection area and the distance to the object are read out from the memory (not shown) of the object-information obtaining unit 203. If the information indicates that an object is present, object information including the position of the object, the size of the object, and/or the shape of the object is obtained. The object information obtained at step S417 is stored, together with the detection time, in the memory 50. The object-information obtaining process then ends.

Referring back to FIG. 2, the main control device 40 determines, at every predetermined timing intervals, when an object is present forward of the vehicle 1 (in the detection area), whether or not the object is moving based on the object information and the like stored in the memory 50. If the object is moving, the main control device 40 further determines motion information including a moving direction and a moving velocity. The main control device 40 causes the object information and the motion information to be displayed on the display device 30.

The main control device 40 determines whether or not a potentially dangerous condition exists based on the object information and the motion information. Upon determining that a potentially dangerous condition exists, the main control device 40 issues alarm information to the sound/alarm generator device 60.

Figure 15:
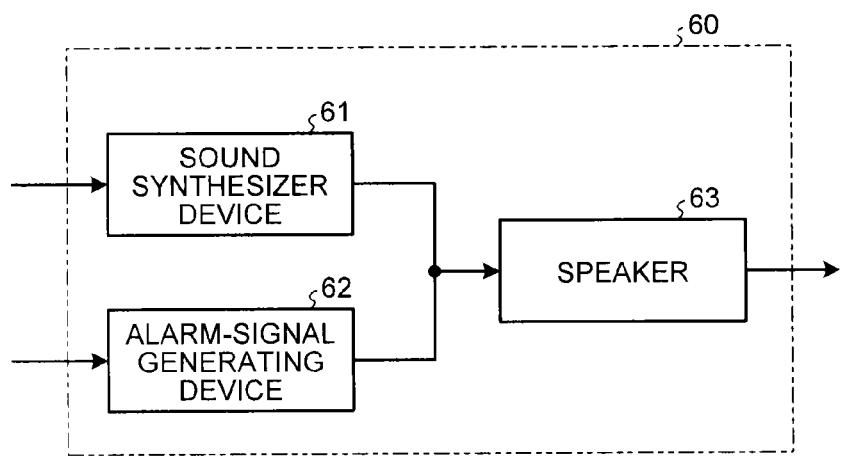
FIG. 15 is a block diagram for describing a configuration of a sound/alarm generator device.

The sound/alarm generator device 60 includes a sound synthesizer device 61, an alarm-signal generating device 62, and a speaker 63 as illustrated in FIG. 15, for example.

The sound synthesizer device 61 includes sound data for a plurality of sounds. Upon receiving the alarm information from the main control device 40, the sound synthesizer device 61 selects sound data for a sound related to the alarm information and outputs the sound data to the speaker 63.

Upon receiving the alarm information from the main control device 40, the alarm-signal generating device 62 generates an alarm signal related to the alarm information and outputs the alarm signal to the speaker 63.

As is apparent from the foregoing description, the object-information obtaining unit 203 according to the embodiment is an embodiment example of processing unit of object detection device according to an aspect of the present invention. The light emission system 201 is an embodiment example of light source unit of object detection device according to an aspect of the present invention. The main control device 40, the memory 50, and the sound/alarm generator device 60 make up an embodiment example of monitoring control device of object detection device according to an aspect of the present invention.

As described above, the laser radar device 20 according to the embodiment includes the light emission system 201, the optical deflector 204, the light detection system 202, and the object-information obtaining unit 203.

The light emission system 201 includes the light source 21 and the coupling lens 22. The light detection system 202 includes the imaging forming lens 28 and the photodetector 29.

Object-reflected light that is reflected in the first end portion is reflected from the rotating polygon mirror to impinge on the imaging forming lens 28. On the other hand, a part of object-reflected light that is reflected in the second end portion is vignetted by the imaging forming lens 28 to impinge on the optical deflector 204, where the part of the light is reflected by the rotating polygon mirror to impinge on the imaging forming lens 28.

This configuration allows making the amount of object-reflected light that is reflected in the second end portion and received by the photodetector 29 and the amount of object-reflected light that is reflected in the first end portion and received by the photodetector 29 substantially equal to each other.

Accordingly, the laser radar device 20 according to the embodiment allows not only compact construction but also enhancing flexibility.

The light source 21 includes the plurality of light-emitting device arrays A equidistantly arranged along the Z-axis direction. Each of the light-emitting device arrays A includes the plurality of light-emitting devices arranged in a two-dimensional array. This configuration allows increasing optical power of detection light emitted from the light emission system 201, thereby increasing the distance to a detectable object.

The object-information obtaining unit 203 obtains object information including the distance to the object based on switch-on time of the light source 21 and light-receiving time of the photodetector 29. Accordingly, object information can be obtained with high accuracy.

Because the monitoring apparatus 10 according to the embodiment includes the laser radar device 20, the monitoring apparatus 10 can obtain object information and motion information with high accuracy.

In the embodiment, although an example in which the diameter D is substantially equal to the diameter C is described, the size of the diameter D is not limited thereto. The diameter D can be of any size smaller than the diameter E.

Figure 16:
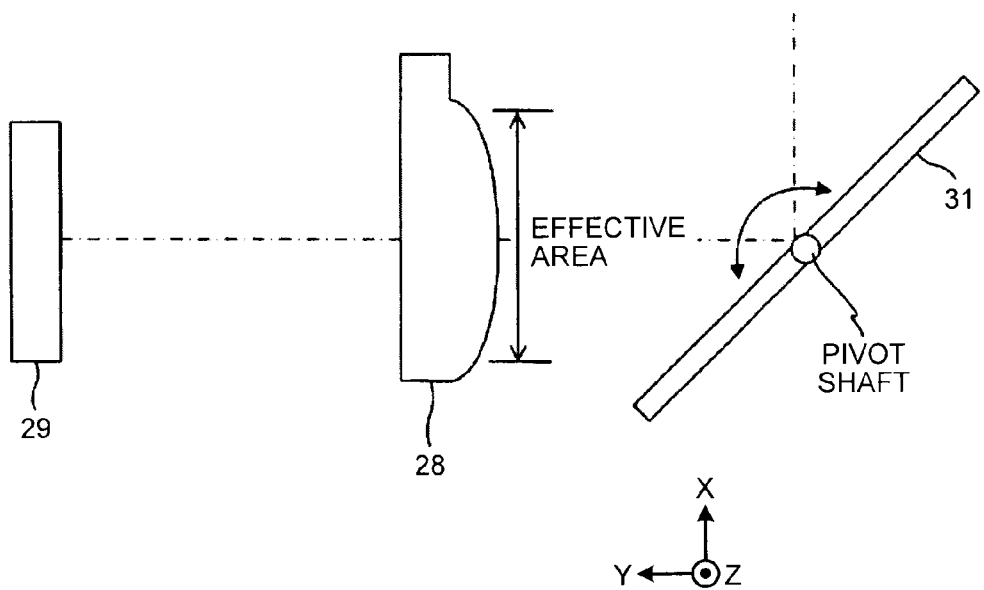
FIG. 16 is a diagram for describing a first modification of the optical deflector.

The embodiment described above may employ a first modification of the optical deflector 204 that includes, in lieu of the rotating polygon mirror described above, a pivot mirror 31 as illustrated in FIG. 16. Pivot shaft of the pivot mirror 31 is substantially on the reflection surface.

Figure 17:
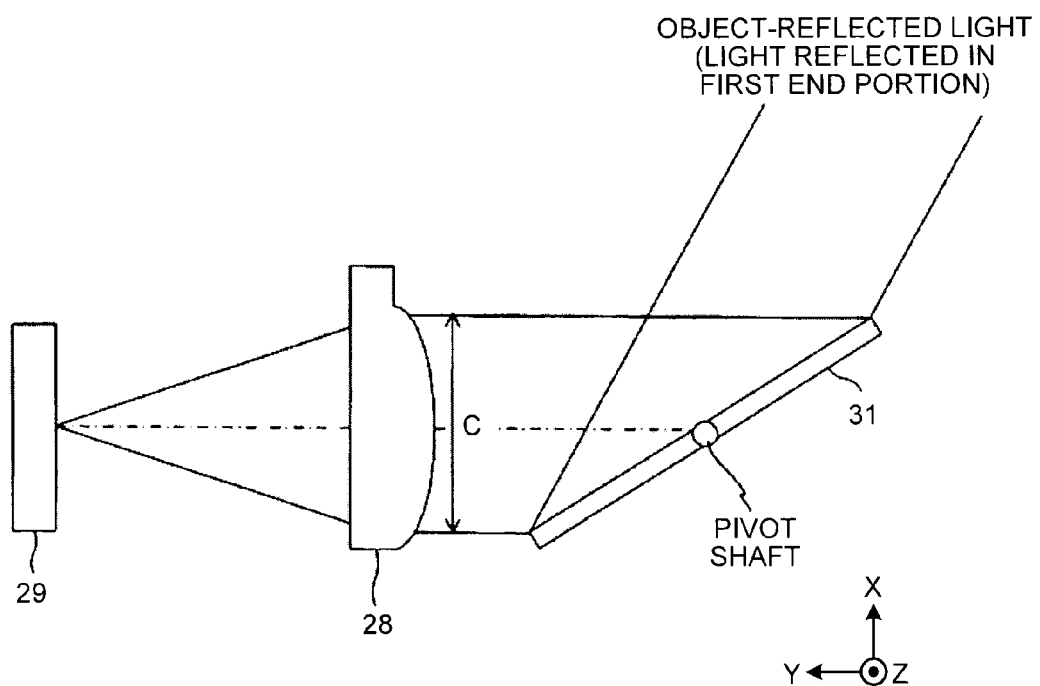
FIG. 17 is a diagram for describing object-reflected light that is reflected in the first end portion and reflected from a pivot mirror in a configuration that employs the first modification of the optical deflector.

FIG. 17 illustrates object-reflected light that is reflected in the first end portion and reflected from the pivot mirror 31.

Figure 18:
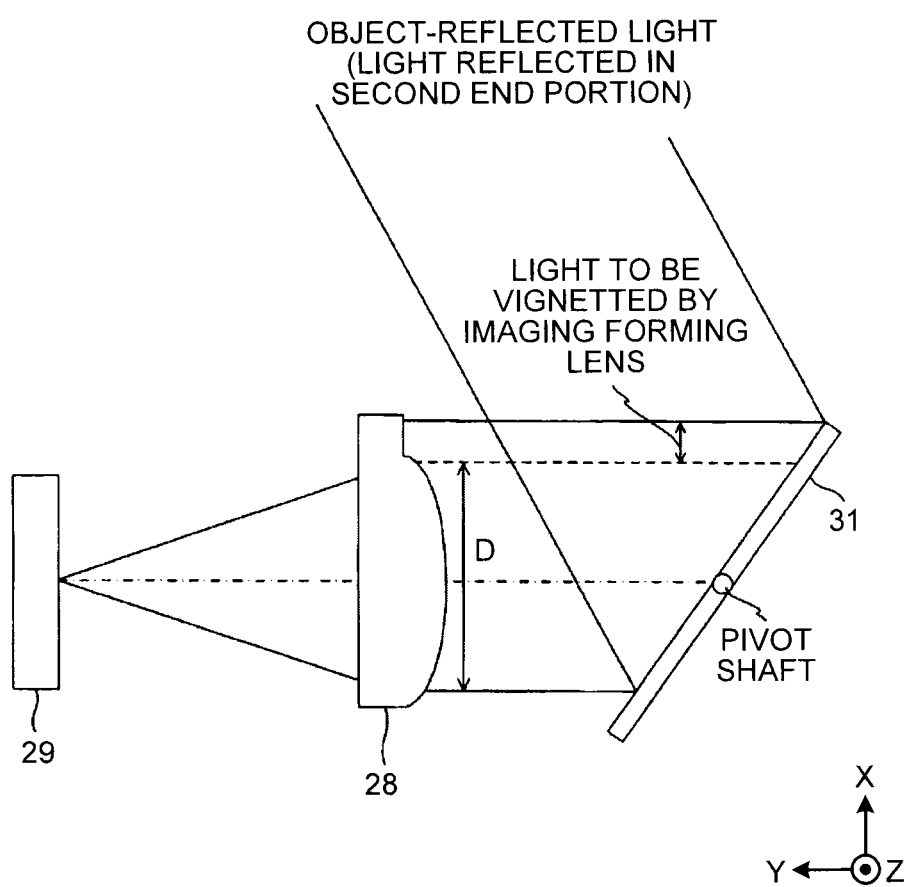
FIG. 18 is a diagram for describing object-reflected light that is reflected in the second end portion and reflected from the pivot mirror in the configuration that employs the first modification of the optical deflector.

FIG. 18 illustrates object-reflected light that is reflected in the second end portion and reflected from the pivot mirror 31. The first modification is configured so that the imaging forming lens 28 vignettes a part of the light reflected from the pivot mirror 31. More specifically, the modification is configured so that the imaging forming lens 28 vignettes a part of one (one incident on a mirror surface (reflection surface) of the pivot mirror 31 at a smaller incident angle than the other) of light reflected from the object in the first end portion of the detection area and light reflected from the object in the second end portion of the detection area. With the first modification, the diameter D can be made substantially equal to the diameter C as well.

As described above, using the pivot mirror 31 allows, as in the embodiment, not only enhancing flexibility but also achieving further compact construction.

The first modification that uses the pivot mirror 31 may alternatively be configured so as to cause a part of the light reflected in the second end portion to impinge on the pivot mirror 31 downstream, in the optical path of the light, of being vignetted by the imaging forming lens 28.

Figure 19:
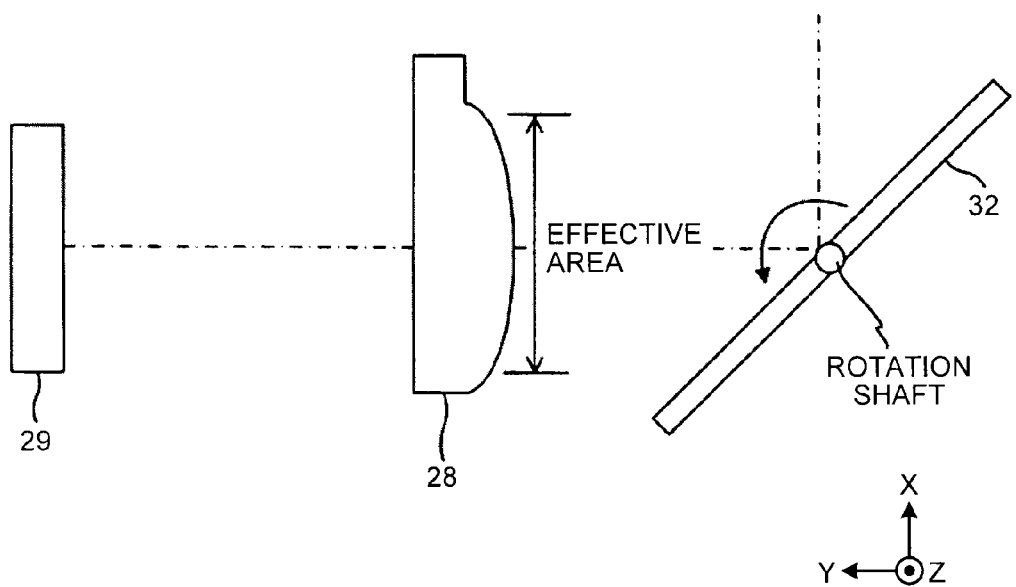
FIG. 19 is a diagram for describing a second modification of the optical deflector.

The embodiment described above may employ a second modification of the optical deflector 204 that includes, in lieu of the rotating polygon mirror described above, a rotary mirror 32 as illustrated in FIG. 19. Rotation shaft of the rotary mirror 32 is substantially on the reflection surface.

Figure 20A:
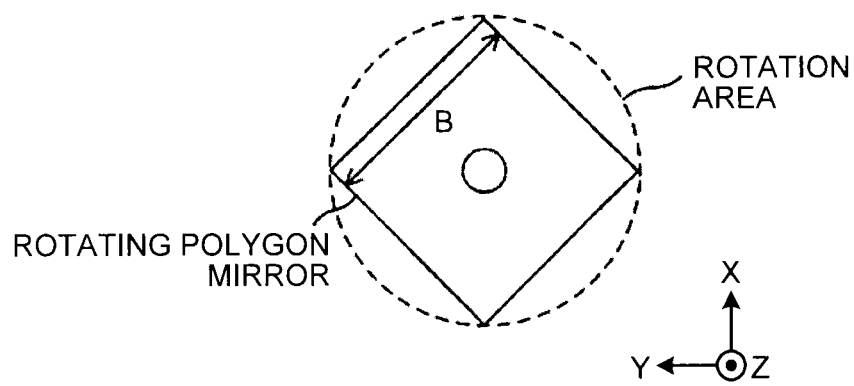
FIGS. 20A and 20B are diagrams each for describing a rotation area.
Figure 20B:
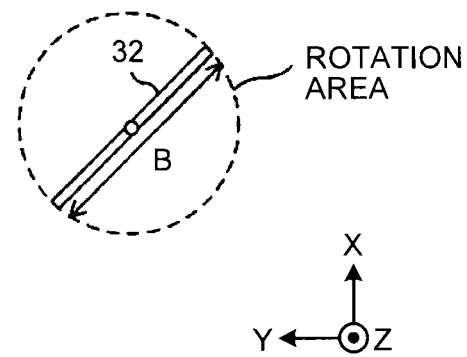

When the size of reflection surface of the rotary mirror 32 is B, which is the same as the embodiment, the second modification can reduce a rotation area of the reflection surface as compared with that of the embodiment as illustrated in FIGS. 20A and 20B. Accordingly, the distance between the imaging forming lens 28 and the rotary mirror 32 can be reduced and, as a result, further compact construction can be achieved. When the rotary mirror 32 has the same rotation area as that of the rotating polygon mirror, the size of the reflection surface can be increased as compared with that of the rotating polygon mirror. As a result, the amount of light to be received by the photodetector 29 can be increased. Accordingly, the detectable distance can be further increased.

The rotary mirror 32 may be either a single-sided mirror or a double-sided mirror.

The embodiment described above may be modified in such a manner that light that is reflected in the second end portion is vignetted by the imaging forming lens 28 downstream, in the optical path of the light, of the reflection surface of the optical deflector 204 rather than upstream of the optical deflector 204.

Figure 21:
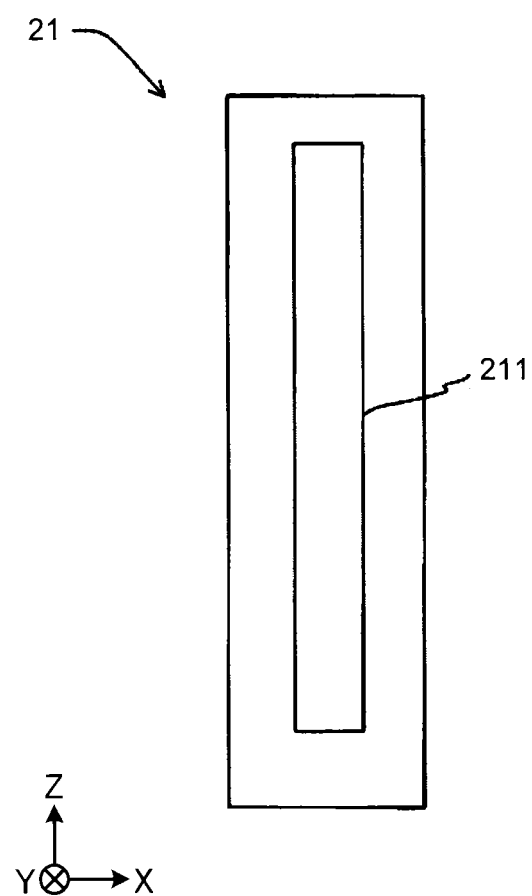
FIG. 21 is a diagram for describing a modification of a light source.
Figure 22:
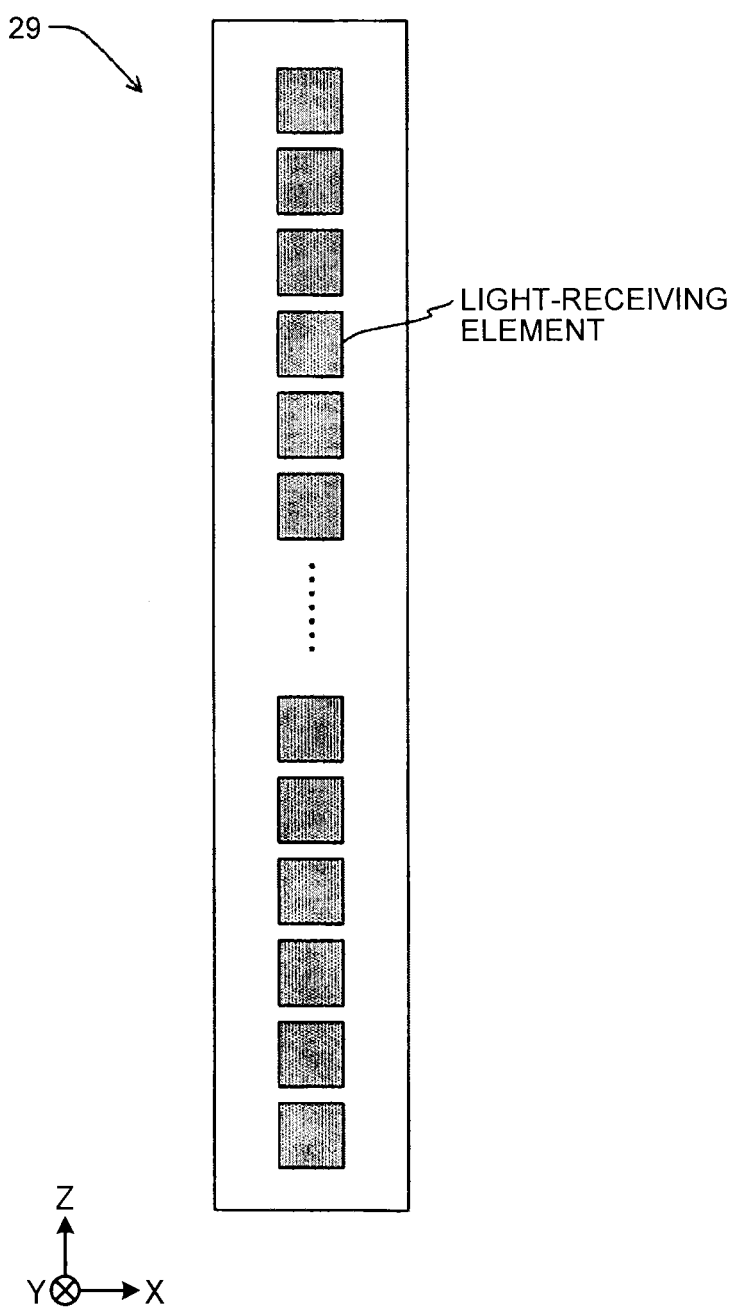
FIG. 22 is a diagram for describing a photodetector adapted to the light source illustrated in FIG. 21.

In the embodiment described above, the light source 21 includes the plurality of light-emitting device arrays arranged along the Z-axis. However, the structure of the light source 21 is not limited thereto. As a modification of the light source 21, the light source 21 may include a single light-emitting device 211 the longitudinal direction of which lies along the Z-axis direction as illustrated in FIG. 21, for example. When this modification is employed, the photodetector 29 preferably includes a plurality of light-receiving elements arranged along the Z-axis direction as illustrated in FIG. 22, for example, so that detection accuracy in the Z-axis direction similar to that of the embodiment can be obtained.

In the embodiment described above, the light emission system 201 is arranged on the positive Z side of the light detection system 202; however, layout of the light emission system 201 is not limited thereto.

In the embodiment described above, the light-emitting device arrays assume a square shape; however, the shape of the light-emitting device arrays is not limited thereto.

In the embodiment described above, the light-emitting device assumes a square shape; however, the shape of the light-emitting device is not limited thereto.

In the embodiment described above, the light-emitting device is a vertical-cavity surface-emitting laser (VCSEL); however, the light-emitting device is not limited thereto. For example, an edge-emitting laser may alternatively be used as the light-emitting device.

In the embodiment described above, the rotating polygon mirror includes four mirror facets; however, the number of the facets is not limited thereto.

The embodiment described above may further include a pivoting mechanism that causes the laser radar device 20 to pivot about the Z-axis.

In the embodiment described above, the light source 21 includes the 28 light-emitting device arrays; however, the number of the light-emitting device arrays is not limited thereto. The number of the light-emitting device arrays may be determined depending on a required size in the Z-axis direction of the detection area. In addition, the number of the light-emitting device arrays may be one.

In the embodiment described above, in the light-emitting device array, the number of rows of the light-emitting devices along the X-axis direction is 240, and the number of the columns of the same along the Z-axis direction is 240; however, array of the light-emitting devices is not limited thereto.

In the embodiment described above, the number of the light-emitting devices arranged along the X-axis direction is equal to the number of the same arranged along the Z-axis direction; however, numerical relationship therebetween is not limited thereto.

In the embodiment described above, in each of the light-emitting device arrays, the plurality of light-emitting devices are arranged in a two-dimensional array; however, arrangement of the light-emitting devices is not limited thereto.

In the embodiment described above, d2 is approximately 0.02 mm; d3 is approximately 0.7 μm; d4 is approximately 1 μm; however, the dimensions are not limited thereto.

In the embodiment described above, the focal length f1 of the coupling lens 22 and the focal length f2 of the coupling lens f2 of the imaging forming lens 28 may be equal to each other. When the focal lengths f1 and f2 are equal to each other, same lenses can be used as the coupling lens 22 and the imaging forming lens 28, and therefore cost reduction can be achieved.

In the embodiment described above, a part of processing performed by the object-information obtaining unit 203 may alternatively be performed by the main control device 40; a part of processing performed by the main control device 40 may alternatively be performed by the object-information obtaining unit 203.

In the embodiment described above, light from the light emission system 201 is deflected by the optical deflector 204; however, the configuration is not limited thereto. If the light emission system 201 emits diverging light with which the detection area can be covered, the need of deflecting the light using the optical deflector 204 is eliminated.

In the embodiment described above, the number of the laser radar devices 20 included in the monitoring apparatus 10 is one; however, the number of the laser radar devices 20 is not limited thereto. The number of the laser radar devices 20 included in the monitoring apparatus 10 may be two or more depending on the size of the vehicle, a monitored area (a detection area), and the like.

In the embodiment described above, the monitoring apparatus 10 uses the laser radar device 20 in monitoring the area forward of the vehicle; however, area to be monitored by the laser radar device 20 is not limited thereto. For example, the laser radar device 20 may alternatively be used in an apparatus that monitors an area to the rear or to a side(s) of a vehicle.

Further alternatively, the laser radar device 20 may be used in a remote sensing apparatus other than those for vehicular use. When the laser radar device 20 is used in such a remote sensing apparatus, the main control device 40 may preferably issue alarm information appropriate for the purpose of remote sensing.

The laser radar device 20 may be used only for detecting presence/absence of an object.

The laser radar device 20 may be used in other apparatuses than remote sensing apparatuses. Examples of the other apparatuses include ranging apparatuses and shape measurement apparatuses.

According to an aspect of the present invention, an object detection device can not only achieve compact construction but also enhance flexibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detection device comprising:
a light source to emit light toward a detection area, the detection area including a first end and a second end which oppose each other;
an optical deflector including a reflection surface which receives and reflects, when an object is positioned in the detection area, light being emitted from the light source and reflected from the object, the light reflected from the object which is in the first end of the detection area proceeds toward the reflection surface of the deflector as a first light, and the light reflected from the object which is in the second end of the detection area proceeds toward the reflection surface of the deflector as a second light;
an optical system arranged on an optical path of the light reflected from the reflection surface of the optical deflector; and
a light receiver to receive the light passed through the optical system,
the optical system vignetting a part of one of the first light and the second light which has an incident angle to the reflection surface which is smaller than an incident angle of another of the first light and the second light to the reflection surface, said one of the first light and the second light which has the incident angle to the reflection surface which is smaller being partially vignetted by the optical system before the light reaches the reflection surface of the optical deflector.

2. The object detection device according to claim 1, wherein the part of the light is vignetted by the optical system upstream of being incident on the optical deflector.

3. The object detection device according to claim 1, wherein the part of the light is vignetted by the optical system downstream of being reflected by the reflection surface of the optical deflector.

4. The object detection device according to claim 1, wherein amount of light reflected by the object in the first end and received by the light receiver and amount of light reflected by the object in the second end and received by the light receiver are equal to each other.

5. The object detection device according to claim 1, wherein:
the optical deflector is a pivot mirror, and
the rotation shaft of the optical deflector is in a center portion of the pivot mirror.

6. The object detection device according to claim 5, wherein light reflected from center of the reflection surface passes through optical axis of the optical system.

7. The object detection device according to claim 1, wherein a central light beam of the light emitted from the light source passes through optical axis of the optical system and received at center of the light receiver.

8. The object detection device according to claim 1, wherein the light emitted from the light source is deflected by the optical deflector, and
a beam diameter of the light emitted from the light source and incident on the optical deflector is smaller than a size of the reflection surface.

9. The object detection device according to claim 1, further comprising a processor configured to obtain information about distance to the object based on turn-on time of the light source and light-receiving time of the light receiver.

10. The object detection device according to claim 9, wherein the processor obtains information about shape of the object based on the information about the distance to the object.

11. A remote sensing apparatus comprising:
the object detection device according to claim 1; and
a monitoring control device configured to obtain motion information including at least any one of whether or not the object is moving, a moving direction of the object, and a moving velocity of the object based on an output of the object detection device.

12. The remote sensing apparatus according to claim 11, wherein the remote sensing apparatus is mounted on a vehicle, and
when the monitoring control device determines that a potentially dangerous condition exists based on at least one of information about position of the object and the motion information, the monitoring control device issues alarm information.

* * * * *